US012617334B2

(12) United States Patent
Kim

(10) Patent No.: US 12,617,334 B2
(45) Date of Patent: May 5, 2026

(54) LAMP SYSTEM CAPABLE OF REDUCING POWER CONSUMPTION

(71) Applicant: HYUNDAI MOBIS CO., LTD., Seoul (KR)

(72) Inventor: Myeong Je Kim, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 187 days.

(21) Appl. No.: 18/499,683

(22) Filed: Nov. 1, 2023

(65) Prior Publication Data

US 2024/0239262 A1 Jul. 18, 2024

(30) Foreign Application Priority Data

Jan. 17, 2023 (KR) ........................ 10-2023-0006635

(51) Int. Cl.
B60Q 1/14 (2006.01)
H05B 47/11 (2020.01)

(52) U.S. Cl.
CPC ............. B60Q 1/143 (2013.01); H05B 47/11 (2020.01); *B60Q 2300/054* (2013.01); *B60Q 2300/30* (2013.01)

(58) Field of Classification Search
CPC .............. B60Q 1/143; B60Q 2300/054; B60Q 2300/30; B60Q 1/14; B60Q 2300/312; B60Q 2300/314; B60Q 2300/332; B60Q 2300/334; B60Q 2300/337; B60Q 2300/41; H05B 47/11; H05B 47/105; H05B 47/14; G06T 7/90
See application file for complete search history.

(56) References Cited

U.S. PATENT DOCUMENTS

| | | | | |
|---|---|---|---|---|
| 2013/0049589 A1* | 2/2013 | Simi | .................... | H05B 45/385 |
| | | | | 315/206 |
| 2014/0159608 A1* | 6/2014 | Simi | ....................... | H05B 45/59 |
| | | | | 315/205 |
| 2018/0020515 A1* | 1/2018 | Rutgers | ............... | G03B 21/2053 |
| 2020/0005634 A1* | 1/2020 | Shuff | ..................... | G08G 1/095 |
| 2020/0209002 A1* | 7/2020 | Hou | ......................... | G06N 20/00 |
| 2020/0333182 A1* | 10/2020 | Ahmed | ................. | G01J 1/4257 |
| 2021/0125542 A1* | 4/2021 | Liu | ........................ | H05B 45/38 |

FOREIGN PATENT DOCUMENTS

| | | | | | |
|---|---|---|---|---|---|
| CN | 107585090 A | * | 1/2018 | ............ | B60Q 1/085 |
| CN | 107776472 B | * | 11/2020 | ............ | B60Q 1/143 |
| EP | 3592111 A1 | * | 1/2020 | ........... | H05B 45/375 |
| JP | 6203463 B1 | * | 9/2017 | .............. | B60Q 1/34 |
| KR | 10-2004-0027751 A | | 4/2004 | | |

* cited by examiner

*Primary Examiner* — Abdullah A Riyami
*Assistant Examiner* — Syed M Kaiser
(74) *Attorney, Agent, or Firm* — NSIP Law

(57) ABSTRACT

A lamp system includes a light output device that includes at least one light source device, the at least one light source device including light sources, and a light source driver for driving the at least one light source device, and a processor to control an output of the light output device based on at least one of received vehicle state information, user input information, vehicle surrounding information, or any combination thereof.

16 Claims, 11 Drawing Sheets

GPS SIGNAL POSITION          POSITION AFTER MAP MATCHING (a)

(b)

(a)

LAMP BRIGHTNESS MINIMUM ADJUSTMENT

(b)

(a)

(b)

(c)

LAMP SYSTEM CAPABLE OF REDUCING POWER CONSUMPTION

CROSS-REFERENCE TO RELATED APPLICATION(S)

This application claims priority under 35 U.S.C. § 119 to Korean Patent Application No. 10-2023-0006635, filed on Jan. 17, 2023, in the Korean Intellectual Property Office, the disclosure of which is incorporated herein by reference in its entirety.

BACKGROUND

1. Field

The following disclosure relates to a lamp system capable of reducing power consumption, and more particularly, to a lamp system capable of reducing power consumption of a vehicle lamp by adjusting brightness of a beam of a lamp light source unit output through vehicle state information within a vehicle, user input information, or vehicle surrounding information outside a vehicle.

2. Description of Related Art

Efforts are being made to reduce power consumption in the automobile field in accordance with CO2 emission regulations, and a trend of increasing the driving efficiency of lamps to reduce power consumption is actively progressing even in vehicle lamps with high power consumption.

In order to reduce the power consumption of such vehicle lamps, Korean Patent Publication No. 10-2004-0027751 discloses reducing power consumption by improving a structure of a light source unit, that is, an LED lamp itself. However, there is a limit to reducing power consumption by improving the structure of the LED lamp, and for this, separate parts may be replaced or devices can be added, which may increase material costs.

Therefore, it is necessary to study a method of reducing power consumption by optimizing and managing power consumption without such an increase in material cost.

For example, in order to increase driving efficiency of vehicle lamps, power consumption may be reduced by adjusting the brightness of the lamp as necessary in consideration of the driving environment of the vehicle.

In this way, improvement of a system capable of reducing power consumption of a lamp is required in consideration of various driving environments or surrounding environments of a vehicle.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In a general aspect of the disclosure, a lamp system includes a light output device that includes at least one light source device, the at least one light source device including a plurality of light sources, and a light source driver for driving the at least one light source device, and a processor configured to control an output of the light output device based on at least one of received vehicle state information, user input information, vehicle surrounding information, or any combination thereof, wherein the vehicle state information includes at least one of vehicle navigation information, adaptive front lighting system (AFLS) driving mode information, temperature information of the light source device, or any combination thereof.

The processor may further be configured to calculate a representative illuminance from the illuminance information, in response to the representative illuminance being lower than a first reference illuminance set in advance, control the light output device so that the output of the light source device is equal to or greater than a first predetermined reference set in advance, and in response to the representative illuminance being equal to or greater than the first reference illuminance set in advance, control the light output device so that the output of the light source device is smaller than the first predetermined reference as the illuminance increases.

The processor may further be configured to calculate an illuminance of output areas for each light source of the light source device from the illuminance for each of a plurality of areas included in the illuminance information, and control the light output device so that the corresponding light source is turned off in response to the calculated illuminance of the output areas for each light source being greater than a set second reference illuminance.

The processor may further be configured to calculate brightness of each pixel based on the photographing information, calculate brightness indices obtained by digitizing the calculated brightness of each pixel, and in response to an average of the brightness indices for all the pixels being greater than a first reference index, control the light output device so that the output of the light source device is smaller than the second predetermined reference as an average of the brightness indices increases.

The processor may further be configured to determine whether there is a vehicle in front based on the surrounding vehicle information, in response to the determination that there is a vehicle in front, control the light output device so that the output of the light source device is smaller than a third predetermined reference, and in response to the determination that there is no vehicle in front, control the light output device so that the output of the light source device is equal to or greater than the third predetermined reference.

The processor may further be configured to calculate surrounding area information based on the navigation information and control the output of the light source device based on the calculated surrounding area information, and control the light output device so that the output of the light source device is smaller than a fourth predetermined reference in a high-illuminance area corresponding to at least one of a downtown area and a tunnel based on the surrounding area information.

The processor may further be configured to control the light output device so that the output of the light source device is smaller than a fifth predetermined reference based on AFLS driving mode information in response to a current location being in E-mode, which is a highway, or V-mode, which is a national highway.

The processor may further be configured to control the light output device so that the output of the light source device is lower than a sixth predetermined reference in response to a temperature of the light source device being greater than a first reference temperature set in advance based on the temperature information of the light source device, and control the light output device so that the output of the light source device is equal to or greater than the sixth predetermined reference in response to the temperature of the light source unit being lower than the first reference temperature.

The processor may further be configured to control the light output device according to weather at a current location based on the weather information, and control the light output device so that the output of the light source device when the weather at the current location has high visibility is lower than an output of the light source device when the weather at the current location has low visibility.

The light source driver may include a buck converter that has one end connected to a power supply, the buck converter configured to buck an input voltage received from the power supply under control of the processor and transmit the bucked input voltage to the light source device, while increasing the switching frequency in inverse proportion or stepwise, and a load capacitor that has one end connected to the other end of the buck converter, the other end connected to a ground, the load capacitor connected in parallel with the light source device.

The buck converter may include a converter switch that has one end connected to the power supply and selectively receives or blocks the input voltage of the power supply under the control of the processor, a reverse current prevention device that has one end grounded and the other end connected to the other end of the converter switch, and an inductor that has one end connected to the other end of the converter switch and the other end connected to the load.

The vehicle surrounding information may include at least one of illuminance information within a set range from the vehicle, photographing information photographed in a set direction from the vehicle, surrounding vehicle information within a set range from the vehicle, weather information, or any combination thereof In another aspect of the disclosure, a lamp system for a vehicle includes a light output device including a light source and a light source driver for driving the light source, and a processor configured to control light output by the light output device based on at least one of vehicle state information, user input information, vehicle surrounding information, or any combination thereof.

The vehicle state information may include at least one of vehicle navigation information, adaptive front lighting system (AFLS) driving mode information, temperature information of the light source, luminescence information of the light source or any combination thereof.

The vehicle surrounding information may include at least one of illuminance information within a set range from the vehicle, photograph information photographed in a set direction from the vehicle, surrounding vehicle information within a set range from the vehicle, weather information, or any combination thereof.

DETAILED DESCRIPTION

Figure 1:
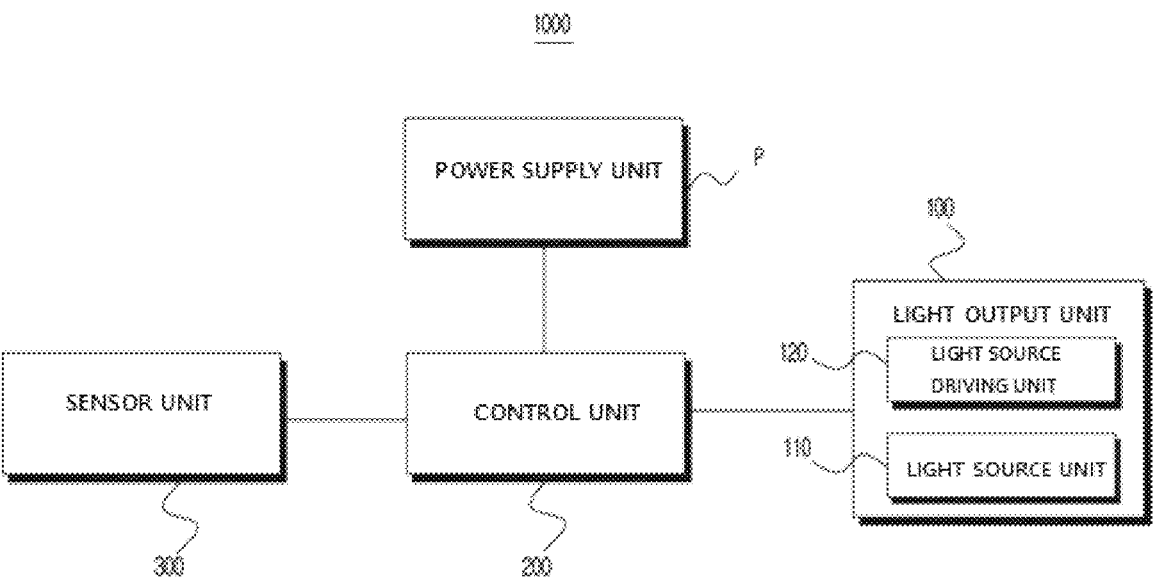
FIG. 1 is a diagram illustrating an internal configuration of a lamp system according to an embodiment.

Hereinafter, embodiments of the present invention will be described in detail with reference to the accompanying drawings so that those skilled in the art to which the present invention pertains may easily practice the present invention. However, the present invention may be implemented in various different forms, and is not limited to exemplary embodiments described herein. In order to clearly explain the present invention in the drawings, parts irrelevant to the description are omitted, and the same reference numerals are used for the same or similar components throughout the specification. In addition, in the case of a well-known known technology, a detailed description thereof will be omitted.

Throughout the present specification, unless explicitly described to the contrary, "comprising" any components will be understood to imply the inclusion of other elements rather than the exclusion of any other elements.

FIG. 1 is a diagram illustrating an internal configuration of a lamp system according to an embodiment of the present invention.

Referring to the drawings, a lamp system 1000 according to an embodiment of the present invention includes a light output unit (or light output device) 100 that includes at least one light source unit (or light source device) 110 including a plurality of light sources and a light source driving unit (or light source driver) 120 driving the at least one light source unit 110 with a predetermined current, and a control unit (or a processor) 200 that controls an output of the light output unit 100 based on at least one of the received vehicle state information, user input information, and vehicle surrounding information.

Here, the light output unit 100 includes the light source unit 110 and the light source driving unit 120. According to an example, the light output unit 100 may include a first light output unit outputting a low beam having a low brightness level and a second light output unit outputting a high beam having a high brightness level.

That is, the lamp system 1000 according to the present invention includes a first light output unit that outputs a low beam, that is, a beam having a low brightness level, through a low driving current, and a second light output unit that outputs a high beam, that is, a beam having a high brightness level, through a high driving current, and when the high beam is to be output according to a vehicle state or vehicle surrounding environment, the control unit 200 drives the second light output unit and when the low beam is to be output, the control unit 200 drives the first light output unit.

Accordingly, in order to solve the problem of increasing power consumption due to uniform beam output in the existing lamp system, in the present invention, it is possible to reduce power consumption by adjusting and outputting the low and high beams according to the vehicle state or the vehicle surrounding environment.

Meanwhile, the control unit 200 controls the output of the light source unit 110 by adjusting the current supplied to the light source unit 110 of the light output unit 100 based on at least one of the received vehicle state information, user input information, and vehicle surrounding information, in which the vehicle state information corresponds to vehicle navigation information, adaptive front lighting system (AFLS) driving mode information, and temperature information of the light source unit 110 and the vehicle surrounding information corresponds to illuminance information within a set range from the vehicle, photographing information photographed in a set direction from the vehicle, vehicle surrounding information within a set range from the vehicle, and weather information.

Accordingly, the control unit 200 may select the output of the light source unit 110 to be a low beam or a high beam output through the vehicle state information, the user input information, and the vehicle surrounding information, and additionally control the brightness adjustment in detail through the adjustment of the supplied current among the low beam and the high beam.

In addition, the vehicle state information and the vehicle surrounding information received by the control unit 200 are provided through the sensor unit (or sensor) 300. As the sensor unit 300, there may be an illuminance sensor that detects an illuminance around a vehicle, a camera that generates photographing information in a set direction, an ADAS sensor that detects obstacles and vehicles around a vehicle, a navigation device that generates navigation information such as a vehicle location and a driving route based on GIS, an AFLS system that generates adaptive front lighting system (AFLS) driving mode information that allows a lamp operation to be changed according to the current road environment, a temperature sensor that measures a temperature of the light source unit 110 and generates temperature information, a vehicle interface unit that receives weather information and GPS information, generates weather information of the current vehicle location, and receives user input information, and the like.

Here, the advanced driver assistance system (ADAS) sensor comprehensively refers to various sensors provided for the ADAS system. As the ADAS sensor, there may be an ultrasonic sensor, a long-range radar, a front camera, a front lidar, a rear radar, a side camera, an infrared image sensor, etc.

Through this, various ADAS functions are performed by detecting obstacles, pedestrians, vehicles, etc., in all directions of the vehicle. In the present invention, the control unit 200 is configured to receive sensing information collected from the ADAS system provided in the vehicle.

In addition, the sensor unit 300 according to the present invention comprehensively refers to a device for providing vehicle state information and vehicle surrounding information to the control unit 200 in a broad sense. An in-vehicle interface for receiving the user input information and receiving weather information and location information from the outside is also included in the sensor unit 300.

Hereinafter, a process in which the control unit 200 controls the beam output of the light output unit 100 through the vehicle state information or the vehicle surrounding information provided through the sensor unit 300 will be described in detail.

Figure 2:
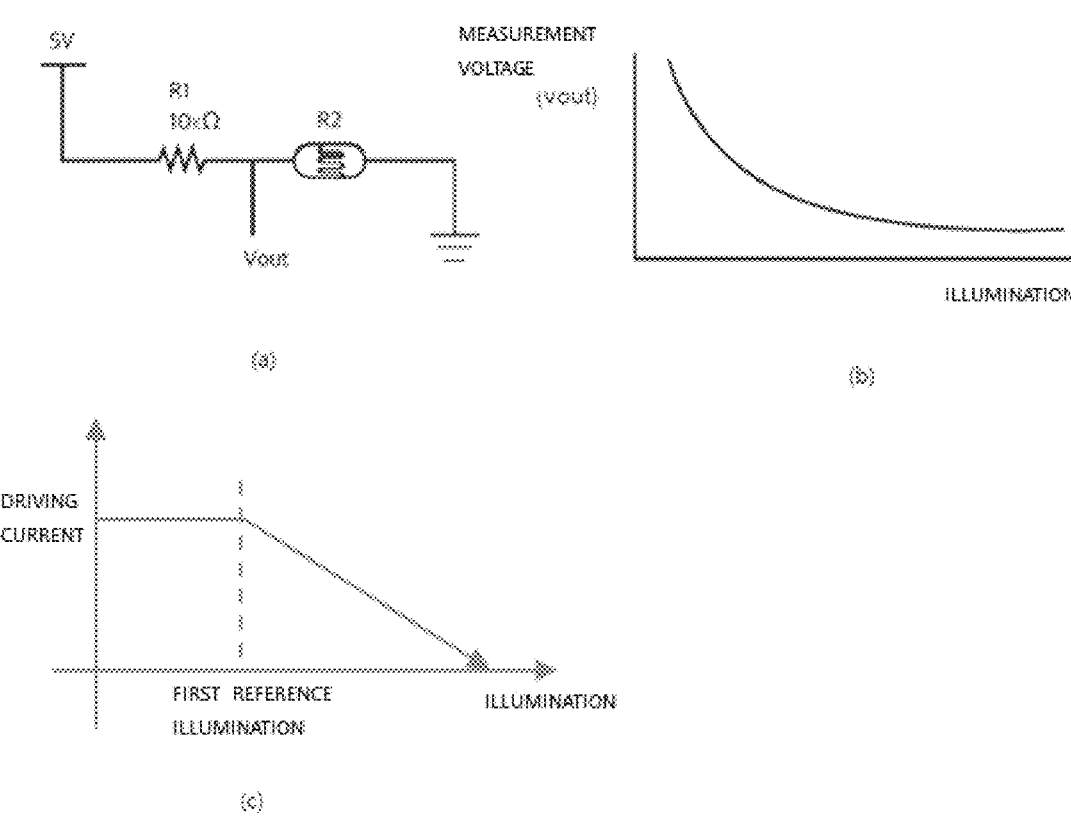
FIG. 2 is a diagram, including parts (a), (b) and (c), that illustrates a relationship between an illuminance sensor and a driving current according to illuminance according to an embodiment.
Figure 3:
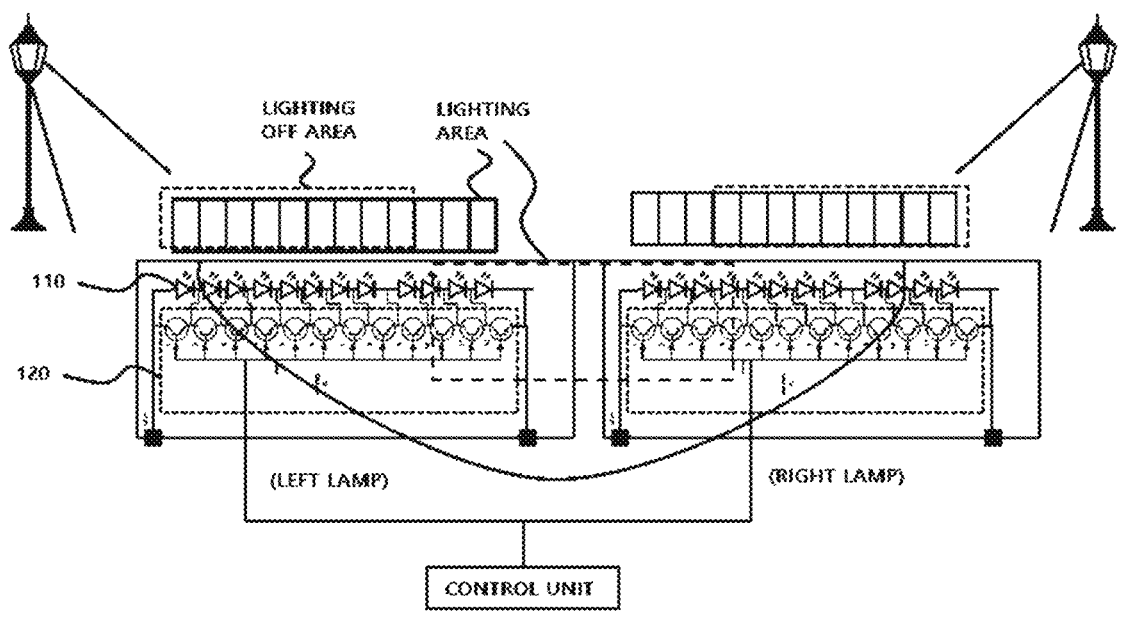
FIG. 3 is a diagram schematically illustrating a configuration of controlling a light source off according to an illuminance of an output area for each light source according to an embodiment.

FIG. 2, including parts (a), (b) and (c), illustrates a relationship between an illuminance sensor and a driving current according to illuminance according to an embodiment of the present invention and FIG. 3 is a diagram schematically illustrating a configuration of controlling a light source off according to an illuminance of an output area for each light source according to an embodiment of the present invention.

Referring to the drawings, in this embodiment, the control unit 200 receives illuminance information from an illuminance sensor to calculate a representative illuminance, and controls the output of the light source unit 110 based on the calculated representative illuminance.

The representative illuminance may be calculated by averaging illuminance for each of a plurality of areas included in the received illuminance information, or may be calculated as representative illuminance by selecting some of the plurality of areas.

In this embodiment, when it is determined that the current external illuminance of the vehicle is bright, the light source driving unit 120 lowers the current supplied to the light source unit 110, and when it is determined that the illuminance is dark, the light source driving unit 120 controls the current supplied to the light source unit 110 to increase. To this end, as illustrated in FIG. 2, parts (a), (b) and (c), according to an embodiment, when the representative illuminance is lower than a first reference illuminance set in advance, the control unit 200 controls the light output unit so that the output of the light source unit 110 is equal to or greater than a first predetermined reference, and when the representative illuminance is equal to or greater than the first reference illuminance set in advance, the control unit 200 controls the light output unit so that the output of the light source unit is smaller than the first predetermined reference as the illuminance increases.

FIG. 2, part (a) illustrates an example of the illuminance sensor, in which Vout is measured through a pull-up resistor R2, the measured Vout is provided to the control unit 200 as the illuminance information, and the control unit 200 calculates the representative illuminance.

Accordingly, the higher the illuminance, the lower Vout, and when the representative illuminance calculated through this illuminance information is lower than the first reference illuminance, the control unit controls the current supplied from the light source driving unit 120 to the light source unit 110 to increase, and when the representative illuminance is greater than the first reference illuminance, controls the current in inverse proportion to decrease.

In addition, as illustrated in FIG. 3, in the present invention, according to another embodiment, the light output unit 100 may be controlled so that the light source that classifies the beam output area of the light source unit 110 composed of a plurality of light sources into areas for each light source, subdivides the received illuminance information into the illuminance of the areas for each light source, and outputs a beam to an area having the current illuminance greater than the second reference illuminance set based on the illuminance of the subdivided areas for each light source is turned off.

That is, as illustrated in FIG. 3, a left side of a left lamp and a right side of a right lamp among the beam areas output from the left lamp and the right lamp, respectively, are in a high illuminance state due to light of a street lamp, and the control unit 200 controls the light source that outputs a beam to an area having such high illumination not to output the beam.

Of course, the control unit 200 of the present invention may individually perform on/off control for a plurality of light sources constituting the light source unit 110, and when the beam output area of the corresponding light source is greater than the second reference illuminance through individual control of the plurality of light sources, the control unit 200 performs off control so that the corresponding light source does not output a beam.

In this way, it is possible to reduce the power consumption of the lamp system by calculating the illuminance for the areas for each light source and preventing the light source in the area greater than the second reference illuminance from outputting a beam.

Figure 4:
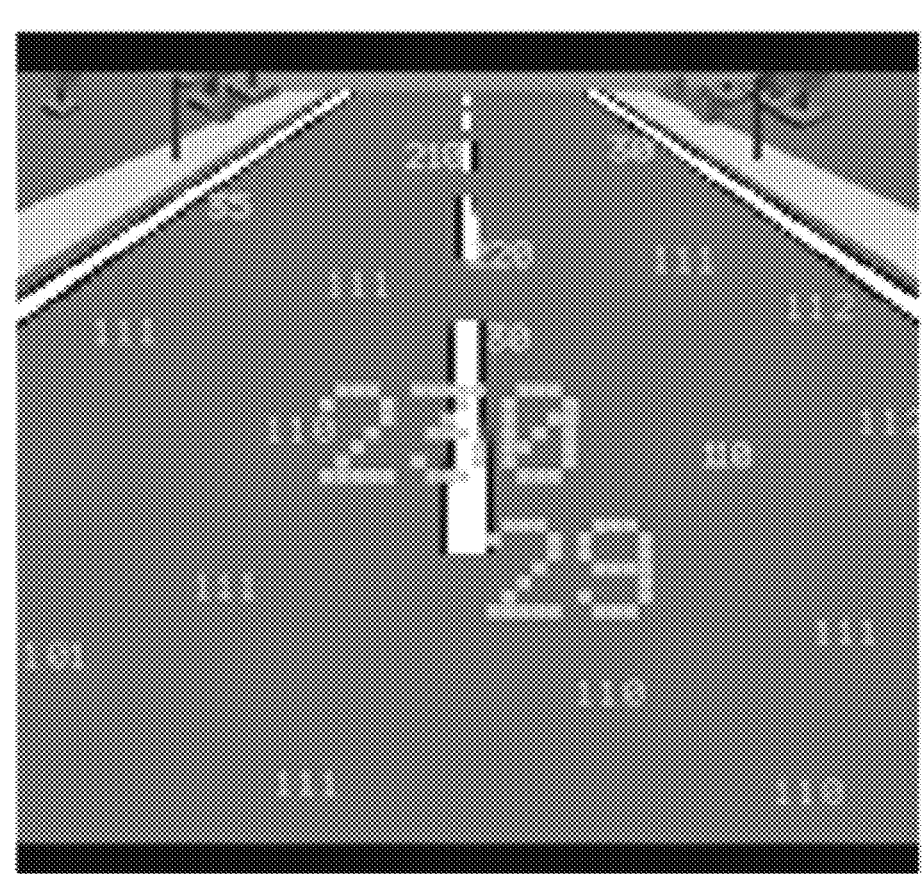
FIG. 4 is a diagram illustrating a state in which brightness of each pixel is digitized in photographing information.

FIG. 4 is a diagram illustrating a state in which brightness of each pixel is digitized in photographing information according to an embodiment of the present invention.

Referring to the drawing, in this embodiment, based on the photographing information received by the control unit 200, the image in the photographing information is changed into pixel data, and for each pixel, a dark pixel is digitized in a small number and a bright pixel is digitized in a large number.

That is, brightness is calculated for each pixel of the image in the photographing information, and a brightness index obtained by digitizing the calculated brightness for each pixel is calculated.

Accordingly, the average of the brightness indices for all pixels in the image may be calculated. When the average of these brightness indices is greater than the first reference index, that is, when the average brightness of the image is greater than the reference brightness, the light output unit 100 is controlled so that the output of the light source unit 110 is smaller than the second predetermined reference as much as the average of the brightness indices is greater than the first reference index.

That is, as the average brightness is greater than the reference brightness, the output of the light source unit 110 is controlled to be smaller than the second predetermined reference.

Of course, when the average of the brightness indices is lower than the first reference index, the output of the light source unit 110 may be controlled to be output to the second predetermined reference or to be driven with an output greater than the second predetermined reference according to the setting.

Accordingly, similar to the above-described illuminance information, it is possible to estimate the brightness information of the area where the beam of the light source unit 110 is output through the photographing information of the camera. As a result, it is possible to reduce the total power consumption by making the output of the light source unit 110 inversely proportional to the brightness level higher than the set brightness value.

Meanwhile, according to an embodiment of the present invention, the control unit 200 may receive the surrounding vehicle information from the ADAS sensor provided in the vehicle and determine whether there is a vehicle in front based on the received surrounding vehicle information, and when it is determined that there is a vehicle in front, the control unit 200 may control the light output unit 100 so that the output of the light source unit 110 is smaller than a third predetermined reference, and when it is determined that there is no vehicle in front, the control unit may control the light output unit 100 so that the output of the light source unit 110 is equal to or greater than the third predetermined reference.

That is, in the present invention, when a vehicle is located in front, the brightness of the front side will be brighter than a predetermined brightness due to the lamp output of the vehicle in front, so the control unit 200 controls the amount of output of the light source unit 110 based on whether or not there is a vehicle in front.

Figure 5:
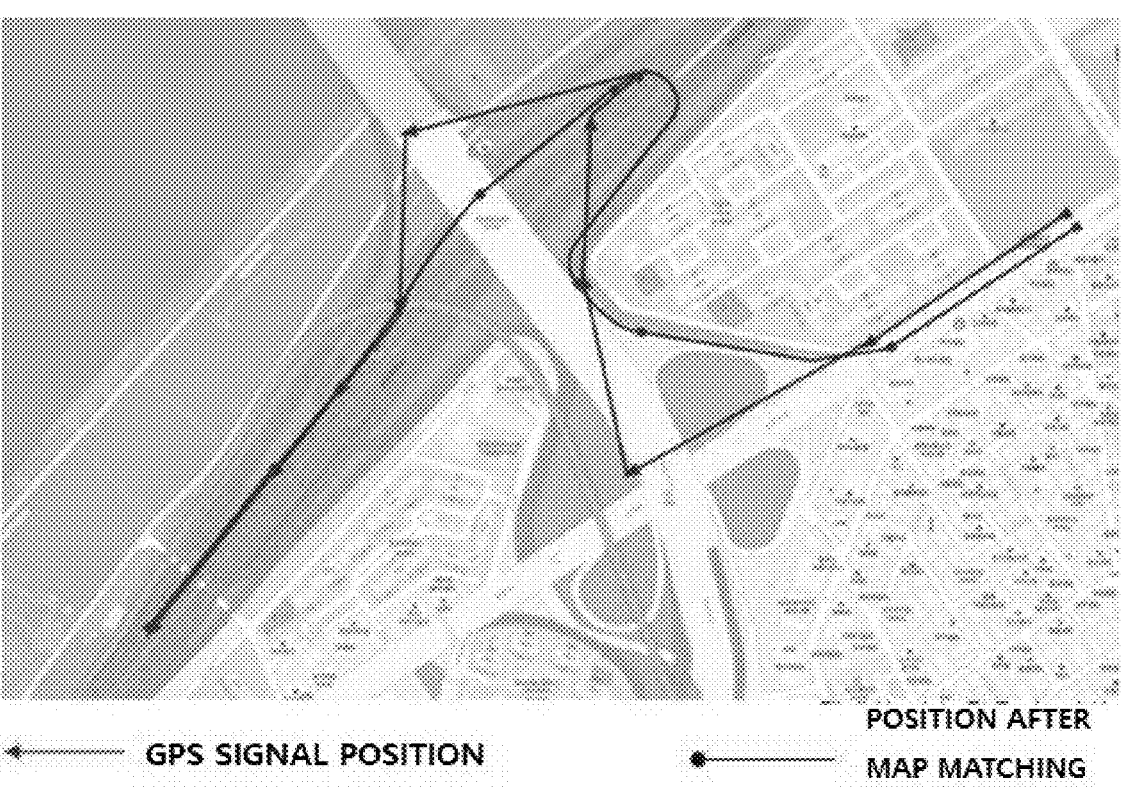
FIG. 5 is a diagram illustrating a process of applying map matching to received global positioning system (GPS) information according.

FIG. 5 is a diagram illustrating a process of applying map matching to received GPS information according to an embodiment of the present invention.

Referring to the drawing, the control unit 200 according to the present embodiment calculates the surrounding area information based on the navigation information and controls the output of the light source unit 110 based on the calculated surrounding area information.

Here, the surrounding area information includes a high-illuminance area corresponding to at least one of a downtown area and a tunnel, and a low-illuminance area not corresponding to at least one of the downtown area and the tunnel. Through this surrounding area information, the control unit 200 controls the amount of output of the light source unit 110.

That is, when the surrounding area information corresponds to the high-illumination area based on the navigation information, the control unit 200 controls the light output unit 100 so that the output of the light source unit 110 is smaller than a fourth predetermined reference, and when the surrounding area information corresponds to the low-illumination area, the control unit 200 controls the light output unit 100 so that the output of the light source unit 110 is equal to or greater than the fourth predetermined reference.

Accordingly, the light output unit 100 outputs a high beam when the vehicle is located in the low-illumination area, and the light output unit 100 outputs a low beam when the vehicle is located in the high-illuminance area, so it is possible to reduce the total power consumption of the lamp system.

Meanwhile, in this embodiment, the area information is classified into the high-illuminance area and the low-illuminance area, but the control unit 200 further subdivides the area information to be classified into three or more areas, and based on this, the control unit 200 may be configured to control the amount of output of the light source unit 110.

In addition, as illustrated in FIG. 5, when the received navigation information does not match the road information by applying the map matching algorithm, the control unit 200 may estimate that a vehicle is driving on a nearby road, calculate area information based on this estimation, and control the light output unit 100.

Figure 6:
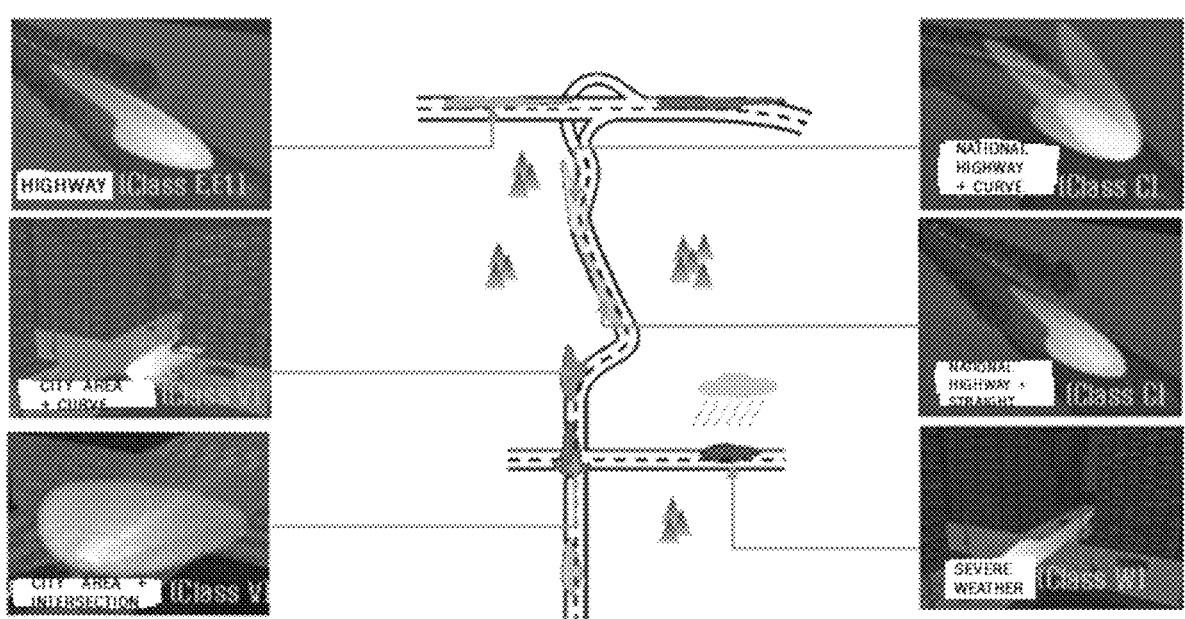
FIG. 6 is a diagram illustrating an adaptive front lighting system (AFLS) driving mode according to an embodiment.

FIG. 6 is a diagram illustrating an AFLS driving mode according to an embodiment of the present invention.

Referring to the drawing, in this embodiment, the control unit 200 controls the light output unit 100 by utilizing the AFLS system installed in the vehicle, and the control unit 200 controls the amount of output of the light source unit 110 based on the received AFLS driving mode information.

Here, the AFLS driving mode information is information indicating which road a vehicle is driving on among a highway, a national highway, and a city road according to the in-vehicle adaptive front lighting system (AFLS).

This AFLS driving mode information is composed of E-mode where the road the vehicle is driving on is a highway, C-mode where the road the vehicle is driving on is a national highway, and V-mode where the road the vehicle is driving on is a city road.

Accordingly, the control unit 200 controls the output of the light source unit 110 to be smaller than a fifth predetermined reference in the case of the E-mode and the V-mode based on the AFLS driving mode information, and controls the output of the light source unit 110 to be equal to or greater than the fifth predetermined reference in the case of the C-mode.

Figure 7:
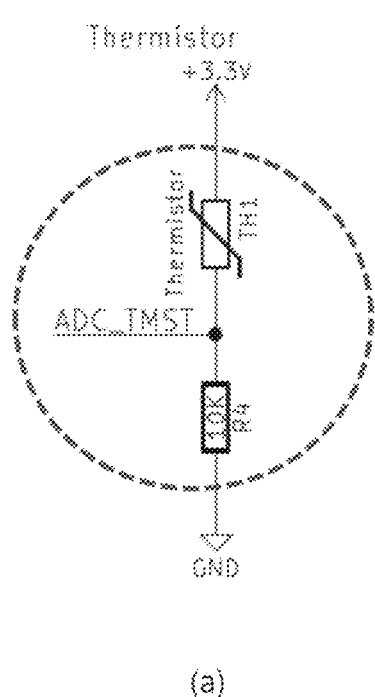
FIG. 7 is a diagram, including parts (a) and (b), that illustrates a temperature sensor according to an embodiment of the present invention and the amount of light according to temperature.
Figure 7:
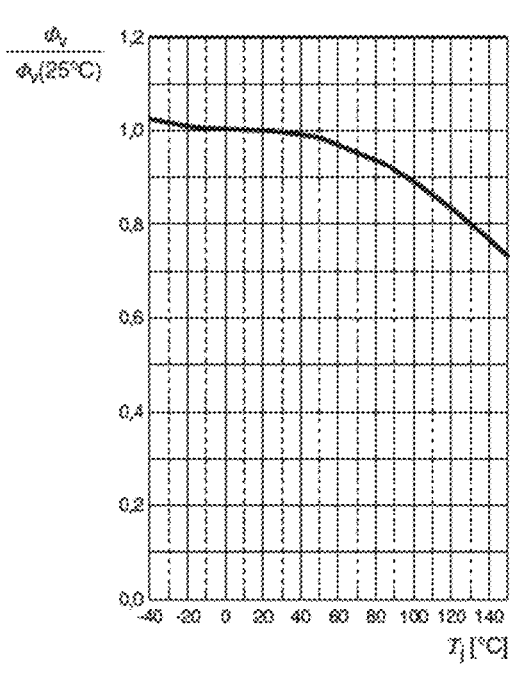

FIG. 7, including parts (a) and (b), is a diagram illustrating a temperature sensor according to an embodiment of the present invention and the amount of light according to temperature.

Referring to the drawing, in this embodiment, the control unit 200 controls the output of the light source unit 110 based on the temperature information of the light source unit 110. As illustrated in FIG. 7, part (b), when the temperature of the light source unit 110 is higher than a certain temperature (60° C. according to one example), it can be seen that luminous intensity is lowered.

Accordingly, when the temperature of the light source unit 110 is higher than a first reference temperature (for example, 60° C.) set in advance to prevent such a decrease in luminous intensity, the output of the light source unit 110 may be controlled to be lower than a sixth predetermined reference temperature, and when the temperature of the light source unit 110 is lower than the first reference temperature, the output of the light source unit 110 may be controlled to be equal to or higher than the sixth predetermined reference temperature.

In this way, when the temperature of the light source unit 110 increases, the temperature of the light source unit 110 may be lowered by lowering the current supplied to the light source unit 110, thereby reducing the power consumption and increasing the light efficiency.

Meanwhile, according to another example, the control unit 200 may control the light output unit according to the weather at the current location based on the received weather information. To this end, the control unit 200 controls the light output unit 100 so that the output of the light source unit 110 when the weather at the current location has high visibility is lower than the output of the light source unit 110 when the weather at the current location has low visibility.

That is, when there is the set output value of the light source unit 110 in the case of the high visibility, the control unit 200 controls the light output unit 100 to have an output value higher than the set output value of the light source unit 110 in the case of the weather having the low visibility.

In general, the weather information received from the vehicle interface unit may be classified into sunny, cloudy, rainfall, snowfall, and fog. The control unit 200 may include a separate measurement unit for measuring visibility to receive and determine measurement information from the measurement unit or designate weather having high visibility and weather having low visibility in order based on visibility according to the setting, and may determine high and low visibility through the designated setting reference, so the output value of the light source unit 110 may be controlled.

Figure 8:
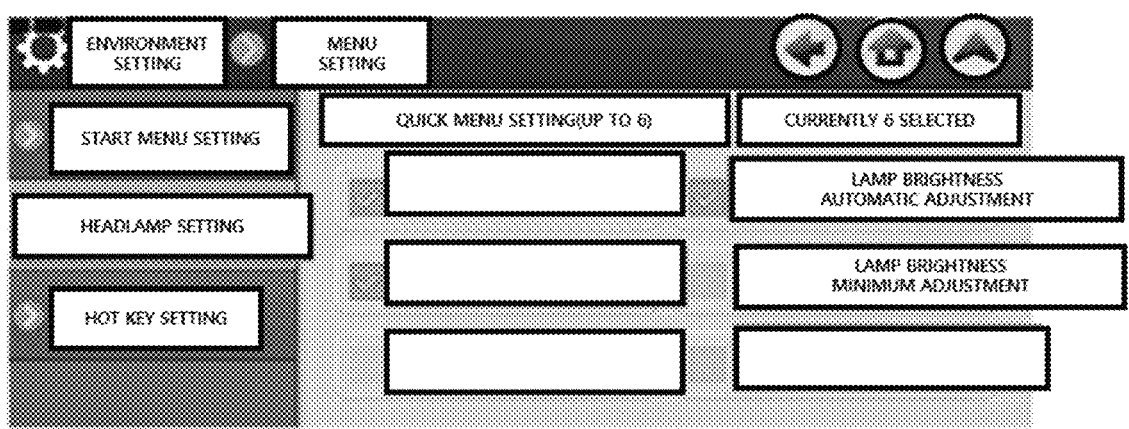
FIG. 8 is a diagram, including parts (a) and (b), that illustrates an interface screen of a user input unit according to an embodiment.
Figure 8:
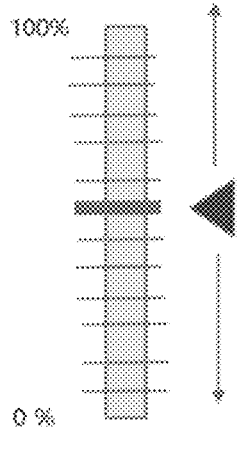

FIG. 8, including parts (a) and (b), is a diagram illustrating an interface screen of a user input unit according to an embodiment of the present invention.

Referring to the drawing, in this embodiment, the control unit 200 controls the output of the light source unit 110 based on the received user input information, in which the user input information is brightness information of an output beam and minimum brightness value information of the output beam.

Accordingly, the control unit 200 may control the amount of output of the light source unit 110 according to the brightness information of the received beam, and even when the output of the light source unit 110 is controlled based on the vehicle state information and the vehicle surrounding information in the above-described embodiment according to the minimum brightness value information of the output beam, the control unit controls the beam not to be output from the light source unit 110 with the brightness of the beam lower than the minimum brightness value of the beam.

Figure 9:
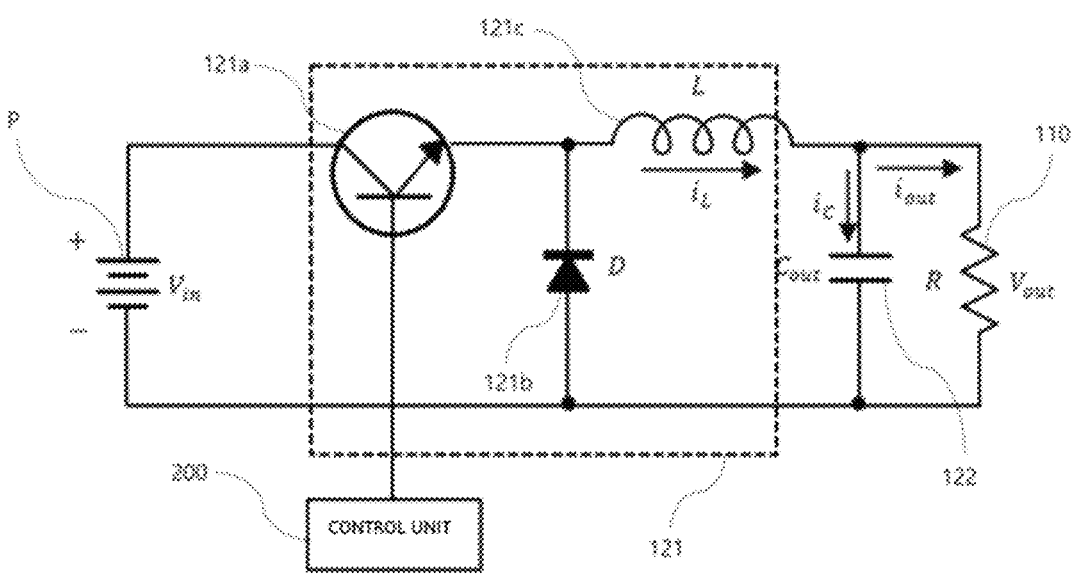
FIG. 9 is a diagram illustrating a light source driving unit according to an embodiment.
Figure 10:
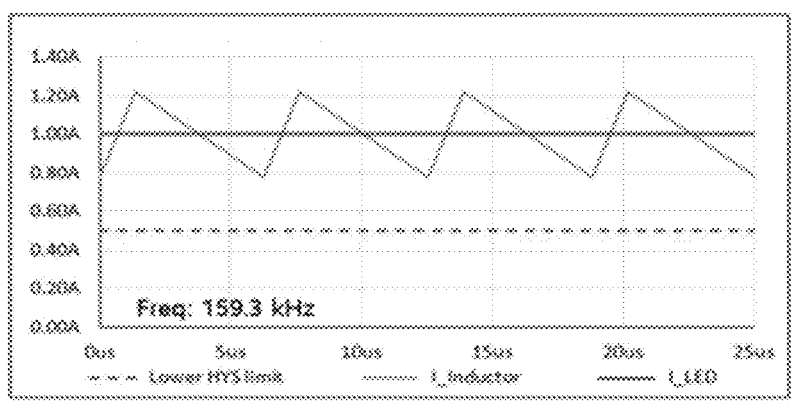
FIG. 10 is a diagram, including parts (a), (b) and (c), that illustrates a process of reducing a driving current and changing a switching frequency according to an embodiment.
Figure 10:
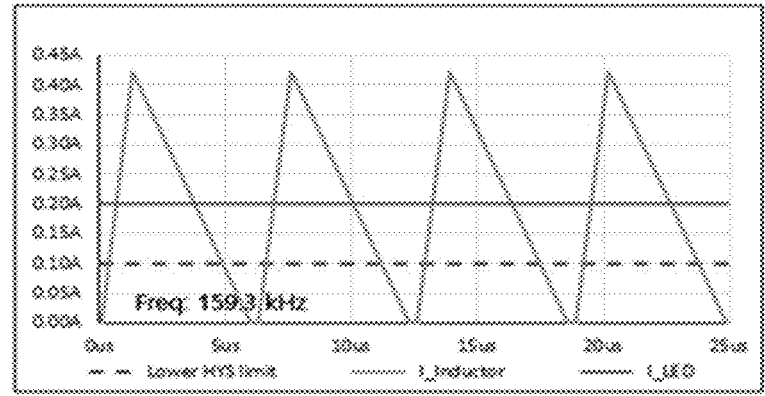
Figure 10:
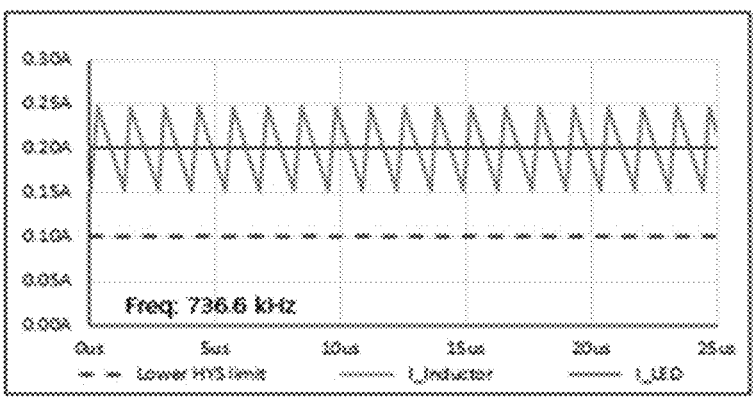

FIG. 9 is a diagram illustrating a light source driving unit according to an embodiment of the present invention, and FIG. 10, including parts (a), (b) and (c), illustrates a process of reducing a driving current and changing a switching frequency according to an embodiment of the present invention.

Referring to the drawings, the light source driving unit 120 according to an embodiment of the present invention has a buck converter unit (or buck converter) 121 that has one end connected to a power supply unit P, and bucks an input voltage received from the power supply unit P under control of the control unit 200 and transmits the bucked input voltage to the light source unit 110, but increases the switching frequency in inverse proportion or stepwise, and a load capacitor 122 that has one end connected to the other end of the buck converter unit 121, the other end connected to ground, and is connected in parallel with the light source unit 110.

As illustrated in FIG. 10, parts (a) and (b), when the control unit 200 simply lowers the driving current of the light source driving unit 120 (1 A→0.2 A), as illustrated in the lower part of FIG. 10, part (b), a discontinuous section in which the current is 0 may occur, which may cause malfunction. In the present invention, the switching frequency is increased when the current is lowered as illustrated in FIG. 10, part (c) to prevent such a discontinuous section.

To this end, as a method of increasing a switching frequency, there may be a method of increasing a switching frequency in inverse proportion to the current decrement and a method of dividing a current decrement into sections and increasing a switching frequency for each section.

As illustrated in FIG. 9, the light source driving unit 120 for increasing the switching frequency according to the decrease in current includes the buck converter unit 121 and the load capacitor 122, and the buck converter unit 121 includes a converter switch 121a that has one end connected to the power supply unit P and selectively receives or blocks the input voltage of the power supply unit P under the control of the control unit 200, a reverse current prevention element 121b that has one end grounded and the other end connected to the other end of the converter switch 121a, and an inductor 121c that has one end connected to the other end of the converter switch 121a and the other end connected to the load, that is, the light source unit 110.

Figure 11:
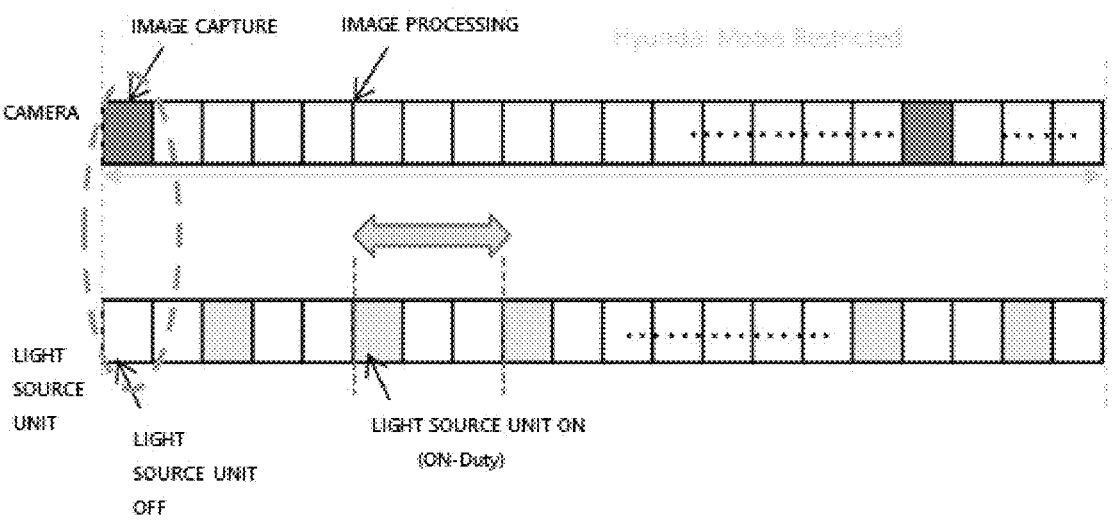
FIG. 11 is a diagram illustrating a state of performing pulse width modulation (PWM) dimming control of a control unit according to an embodiment.

FIG. 11 is a diagram illustrating a state of performing PWM dimming control of a control unit according to an embodiment of the present invention.

Referring to the drawing, the control unit 200 according to the present embodiment may apply a PWM dimming method when controlling the driving current of the light source driving unit 120.

That is, by allowing the light source unit 110 to be turned on only for a certain duty per unit time, power consumption can be reduced by reducing driving current.

In this case, when an image acquisition frequency (HSYNC) for the camera line and a PWM drive frequency do not match, camera flickering may occur. Therefore, it is preferable to find and apply a PWM frequency at which the camera flickering does not occur.

Accordingly, as the duty of turning on the light source unit 110 decreases, the amount of driving current decreases.

As described above, the present invention has been described with respect to a plurality of preferred embodiments, but these embodiments may be configured as individual embodiments, or a plurality of embodiments may be configured in combination.

For example, when the vehicle state information, the user input information, and the vehicle surrounding information received by the control unit is composed of only one of the illuminance information, the vehicle surrounding information, and the navigation information, the control unit 200 may control the output of the light output unit 100. As another configuration example, when the vehicle state information, the user input information, and vehicle surrounding information received by the control unit receive all the illuminance information, the vehicle surrounding information, and the navigation information, the control unit 200 may be configured to control the output of the light output unit based on the received information.

Accordingly, the plurality of embodiments described above may be combined in various forms, so the control unit may control the output of the light output unit.

According to the present invention, power consumed by a lamp can be reduced to increase energy efficiency, and thus, differentiation of lamp systems is possible, thereby improving product competition.

Although exemplary embodiments of the present disclosure have been described hereinabove, the present disclosure is not limited to the above-mentioned specific exemplary embodiments. That is, many modifications and alterations of the present disclosure may be made by those skilled in the art to which the present disclosure pertains without departing from the spirit and scope of the accompanying claims. In addition, it is to be considered that all of these modifications and alterations fall within the scope of the present disclosure.

What is claimed is:

1. A lamp system comprising:
   a light output device that includes:
      at least one light source device, the at least one light source device including a plurality of light sources; and
      a light source driver configured to drive the at least one light source device; and
      a processor configured to control an output of the light output device based on user input information and at least one of vehicle state information and vehicle surrounding information,
      wherein the vehicle state information includes at least one of vehicle navigation information, adaptive front lighting system (AFLS) driving mode information, temperature information of the light source device, or any combination thereof,
      wherein the processor is further configured to calculate surrounding area information based on the navigation information and control the output of the light source device based on the calculated surrounding area information, and
      wherein the processor is further configured to control the light output device so that the output of the light source device is smaller than a fourth predetermined reference in a high-illuminance area corresponding to at least one of a downtown area and a tunnel based on the surrounding area information.

2. The lamp system of claim 1, wherein the processor is further configured to:
   calculate a representative illuminance from the illuminance information;
   in response to the representative illuminance being lower than a first reference illuminance set in advance, control the light output device so that the output of the light source device is equal to or greater than a first predetermined reference set in advance, and
   in response to the representative illuminance being equal to or greater than the first reference illuminance set in advance, control the light output device so that the output of the light source device is smaller than the first predetermined reference as the illuminance increases.

3. A lamp system comprising:
   a light output device that includes:
      at least one light source device, the at least one light source device including a plurality of light sources; and
      a light source driver configured to drive the at least one light source device; and
      a processor configured to control an output of the light output device based on user input information and at least one of vehicle state information and vehicle surrounding information,
      wherein the vehicle state information includes at least one of vehicle navigation information, adaptive front lighting system (AFLS) driving mode information, temperature information of the light source device, or any combination thereof
      wherein the processor is further configured to control the light output device so that the output of the light source device is smaller than a fifth predetermined reference based on AFLS driving mode information in response to a current location being in E-mode, which is a highway, or V-mode, which is a national highway.

4. The lamp system of claim 1, wherein the processor is further configured to:
   calculate brightness of each pixel based on the photographing information;
   calculate brightness indices obtained by digitizing the calculated brightness of each pixel, and
   in response to an average of the brightness indices for all the pixels being greater than a first reference index, control the light output device so that the output of the light source device is smaller than the second predetermined reference as an average of the brightness indices increases.

5. The lamp system of claim 1, wherein the processor is further configured to determine whether there is a vehicle in front of the host vehicle based on the surrounding vehicle information,
   in response to the determination that the vehicle in front is present, control the light output device so that the output of the light source device is smaller than a third predetermined reference, and
   in response to the determination that there is no vehicle in front, control the light output device so that the output of the light source device is equal to or greater than the third predetermined reference.

6. The lamp system of claim 1, wherein the processor is further configured to:
   control the light output device according to weather at a current location based on the weather information; and
   control the light output device so that the output of the light source device when the weather at the current location has high visibility is lower than an output of the light source device when the weather at the current location has low visibility.

7. The lamp system of claim 1, wherein the light source driver includes:

a buck converter that has one end connected to a power supply, the buck converter configured to buck an input voltage received from the power supply under control of the processor and transmit the bucked input voltage to the light source device, while increasing the switching frequency in inverse proportion or stepwise; and a load capacitor that has one end connected to the other end of the buck converter, the other end connected to a ground, the load capacitor connected in parallel with the light source device, and wherein the buck converter includes:

a converter switch that has one end connected to the power supply and selectively receives or blocks the input voltage of the power supply under the control of the processor;

a reverse current prevention device that has one end grounded and the other end connected to the other end of the converter switch; and an inductor that has one end connected to the other end of the converter switch and the other end connected to the load.

8. The lamp system of claim 1, wherein the vehicle surrounding information includes at least one of illuminance information within a set range from the vehicle, photograph information photographed in a set direction from the vehicle, surrounding vehicle information within a set range from the vehicle, weather information, or any combination thereof.

9. A lamp system for a vehicle, the system comprising:

a light output device including a light source and a light source driver for driving the light source; and a processor configured to control light output by the light output device based on user input information and at least one of vehicle state information and vehicle surrounding information, wherein the processor is further configured to:

control the light output device so that the output of the light is lower than a sixth predetermined reference in response to a temperature of the light source device being greater than reference temperature set in advance based on the temperature information of the light source device, and control the light output device so that the output of the light source device is equal to or greater than the sixth predetermined reference in response to the temperature of the light source unit being lower than the first reference temperature.

10. The system of claim 9, wherein the vehicle state information comprises at least one of vehicle navigation information, adaptive front lighting system (AFLS) driving mode information, temperature information of the light source, luminescence information of the light source or any combination thereof.

11. The system of claim 9, wherein the vehicle surrounding information includes at least one of illuminance information within a set range from the vehicle, photograph information photographed in a set direction from the vehicle, surrounding vehicle information within a set range from the vehicle, weather information, or any combination thereof.

12. The lamp system of claim 3, wherein the processor is further configured to:

calculate an illuminance of output areas for each light source of the light source device from the illuminance for each of a plurality of areas included in the illuminance information; and control the light output device so that the corresponding light source is turned off in response to the calculated illuminance of the output areas for each light source being greater than a set second reference illuminance.

13. The lamp system of claim 3, wherein the processor is further configured to:

calculate a representative illuminance from the illuminance information;

in response to the representative illuminance being lower than a first reference illuminance set in advance, control the light output device so that the output of the light source device is equal to or greater than a first predetermined reference set in advance, and in response to the representative illuminance being equal to or greater than the first reference illuminance set in advance, control the light output device so that the output of the light source device is smaller than the first predetermined reference as the illuminance increases.

14. The lamp system of claim 3, wherein the processor is further configured to:

control the light output device according to weather at a current location based on the weather information; and control the light output device so that the output of the light source device when the weather at the current location has high visibility is lower than an output of the light source device when the weather at the current location has low visibility.

15. The lamp system of claim 3, wherein the light source driver includes:

a buck converter that has one end connected to a power supply, the buck converter configured to buck an input voltage received from the power supply under control of the processor and transmit the bucked input voltage to the light source device, while increasing the switching frequency in inverse proportion or stepwise; and a load capacitor that has one end connected to the other end of the buck converter, the other end connected to a ground, the load capacitor connected in parallel with the light source device, and wherein the buck converter includes:

a converter switch that has one end connected to the power supply and selectively receives or blocks the input voltage of the power supply under the control of the processor;

a reverse current prevention device that has one end grounded and the other end connected to the other end of the converter switch; and an inductor that has one end connected to the other end of the converter switch and the other end connected to the load.

16. The lamp system of claim 3, wherein the vehicle surrounding information includes at least one of illuminance information within a set range from the vehicle, photograph information photographed in a set direction from the vehicle, surrounding vehicle information within a set range from the vehicle, weather information, or any combination thereof.

* * * * *